United States Patent Office 3,478,000
Patented Nov. 11, 1969

3,478,000
RECOVERY OF POLY(ARYLENE SULFIDES)
William E. Saunders and William L. Stalder, Bartlesville, Okla., assignors to Phillips Petroleum Company, a corporation of Delaware
No Drawing. Filed Nov. 20, 1967, Ser. No. 684,472
Int. Cl. C08g 23/00
U.S. Cl. 260—79.1                                    6 Claims

ABSTRACT OF THE DISCLOSURE

Recovery of poly(arylene sulfide) substantially free of impurties by evaporating organic polar diluent from a slurry of poly(arylene sulfide) solid polymer particles in the diluent which also contains by-product alkali metal halide and other impurities prior to washing and filtering or centrifuging to obtain processable polymer particles.

BACKGROUND OF THE INVENTION

This invention relates to the recovery of poly(arylene sulfides). In accordance with another aspect, a poly(arylene sulfide) is recovered by filtering a slurry of the polymer which has been previously treated to remove organic polar diluent therefrom. In accordance with a further aspect, a poly(arylene sulfide) compound is separated from mixtures thereof with alkali metal halides and polar-organic diluents by evaporating the diluent from the mixture prior to filtering so as to obtain processable polymer particles. In another aspect, alkali metal halides and polar organic diluents are separated from mixtures thereof with poly(arylenesulfide) compounds by evaporating the polar organic diluent after which the polymer phase is washed with water and/or hydrocarbon and then centrifuged or filtered for recovery of purified polymer.

It is generally known in the polymer art that the ash or residue content of finished polymers may have a dramatic influence on their chemical, physical, and electrical properties. As a result, it is usually desirable to remove from the finished polymer, impurities produced in the reactor or present in the polymer for whatever reason. It is also necessary in the production of polymers to provide for the separation of polymer and diluent and/or unreacted monomers. The degree of purification desired and consequently the criticality of the separation techniques employed varies with the intended application of the finished polymer and the degree of adverse influence that results in the presence of minor amounts of diluent, catalyst residue, etc., in either the product or recycle process streams, i.e., diluents, etc.

The degree of these influences and the nature of the purification techniques employed is necessarily determined by the particular polymer or class of polymers, the nature of a particular catalyst residue and other impurities, and the characteristics of the polymerization diluent. For example, in the production of poly(arylene sulfide) compounds by the reaction of polyhalo-substituted aromatic compounds with alkali metal sulfides in the presence of a polar organic diluent, it is necessary to provide sufficient polymer recovery means for removing alkali metal halides produced during the reaction and the organic diluent from the finished polymer. Requirements of a polymer recovery and purification procedure employed in the production of these poly(arylene sulfides) are important due to the necessity of removing alkali metal halides from the polymer and the desirability of recovering and purifying the relatively expensive polar organic diluent.

Considerable difficulty has been experienced in the studies to date in washing poly(arylene sulfide) polymers free of by-product alkali metal halide impurities. It has been virtually impossible to filter or centrifuge the effluent from the poly(arylene sulfide) reactor containing polar organic diluent as the polymer formed a "pasty" cake that simply could not be washed free of salt. Contacting of the reactor effluent with various organic materials showed some promise but was slow.

It has been found quite unexpectedly that poly(arylene sulfide) polymers and especially poly(phenylene sulfide) polymers can be filtered or centrifuged rather easily if the polar organic diluent is removed from the polymer slurry prior to filtering.

Accordingly, an object of this invention is to provide an improved method for recovering poly(arylene sulfide) polymers from reaction systems in which they are produced. Another object of this invention is to provide a method for removing polar organic diluents and mineral impurities from poly(arylene sulfide) compounds.

It is another object of this invention to provide a method for removing alkali metal halides and polar organic diluent from poly(arylene sulfide) compounds.

It is yet another object of this invention to recover polar organic diluents from slurries thereof with poly(arylene sulfides).

It is another object of this invention to provide a process for recovering poly(arylene sulfide) compounds of improved processing characteristics.

Other aspects, objects and advantages of this invention will be apparent to one skilled in the art upon reading the specification and the appended claims.

SUMMARY OF THE INVENTION

In accordance with the invention slurries of the poly(arylene sulfides) in organic polar diluents containing alkali metal halides and other impurities are subjected to evaporation to remove polar organic diluents and then subjected to a filtering or centrifuging operation to obtain substantially impurity-free polymer.

In accordance with one embodiment, the effluent from a poly(phenylene sulfide) reactor comprising a slurry of solid polymer particles in organic polar diluent with some by-product alkali metal halide and other impurities, the slurry is subjected to low pressure evaporation, either in the reactor or in a separate evaporation zone, for removal of essentially all of the polar organic diluent. The remaining polymer and impurities, following evaporation, are reslurried and washed with water and/or hydrocarbon, and then centrifuged or filtered, with additional washing if necessary, for recovery of high-purity polymer.

It has been found that the removal of the organic polar diluent from the poly(arylene sulfide) slurries prior to washing and filtering or centrifuging results in the recovery of highly processable polymer particles with a high degree of purtiy.

As indicated above, the removal of polar organic diluent from the slurry can be effected by evaporation in the polymer reactor itself or in a separate evaporation zone. It is presently preferred to carry out the evaporation by subjecting the slurry to low pressure or vacuum flashing to remove polar organic diluent.

The filtering operation for the removal of alkali metal halide and other impurities from the poly(arylene sulfide) mixtures substantially freed from polar organic diluent can be effected in conventional filters, including gravity, Nutsche, pressure, rotary and leaf filters, as well as centrifuges such as batch basket centrifuges, continuous scroll-type centrifuges, and centrifugal filters, and the like. The filtering or centrifuging operations can be carried out in a continuous, batch or a semicontinuous manner.

The process of this invention is useful with poly(arylene sulfides) generally, regardless of the method of preparation. However, the invention is especially useful with polymers prepared with the solution reaction of polyhalo compounds with metal sulfide as described in copending application Ser. No. 327,143, filed Nov. 27, 1963, now U.S. Patent No. 3,354,129.

DESCRIPTION OF THE PREFERRED EMBODIMENTS

The production of the poly(arylene sulfide) compound to which this invention particularly relates is disclosed in said copending application.

According to said copending application poly(arylene sulfide) polymers can be prepared at high yield by reacting at least one polyhalo-substituted cyclic compound containing unsaturation between adjacent ring atoms and wherein the halogen atoms are attached to ring carbon atoms with an alkali metal sulfide in a polar organic diluent at an elevated temperature. Generally, the polar organic diluent will substantially dissolve both of the alkali metal sulfide and the polyhalo-substituted aromatic compound or other compound which can be present. The polymers produced by the process of said copending application are ordinarily particulate materials and the properties of these materials will vary considerably depending upon the chosen reactants. Some are high melting thermoplastic materials having excellent high temperature stability, while others can be much lower in molecular weight, including liquids and grease-like materials. Melting point or softening point of these polymers can range all the way from liquids at 25° C. to polymers melting above 400° C.

The polyhalo-substituted compounds which can be employed as primary reactants according to said copending application are represented by the formulas:

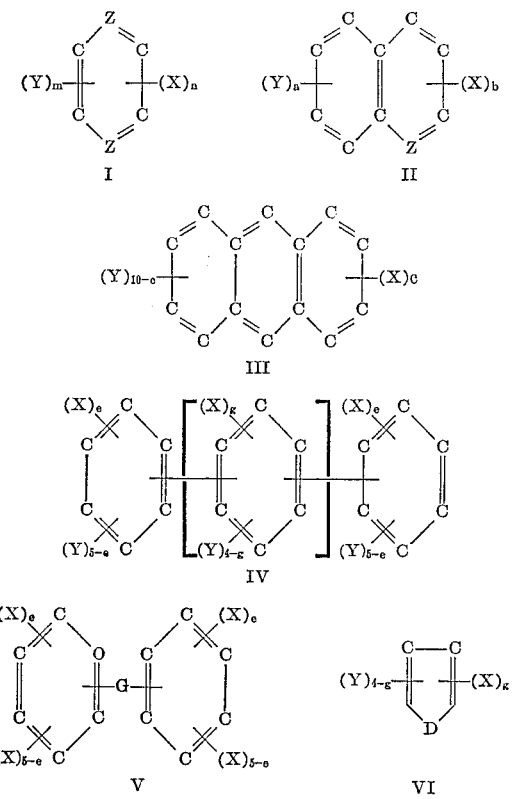

wherein each X is a halogen selected from the group consisting of chlorine, bromine, iodine, and fluorine, preferably chlorine and bromine, each Y is selected from the group consisting of hydrogen, —R, —N(R)$_2$,

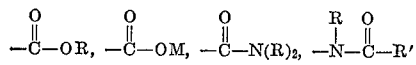

—O—R′, —S—R′, —SO$_3$H, and —SO$_3$M, wherein each —R is selected from the group consisting of hydrogen and alkyl, cycloalkyl, aryl, aralkyl, and alkaryl radicals containing from 1 to 12 carbon atoms, inclusive; each R′ is selected from the group consisting of alkyl, cycloalkyl, aryl, aralkyl and alkaryl radicals containing from 1 to 12 carbon atoms, inclusive; each Z is selected from the group consisting of —N= and —C=; D is selected from the group consisting of —O—, —S—, and

G is selected from the group consisting of

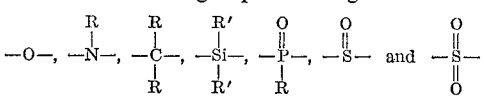

M is an alkali metal selected from the group consisting of sodium, potassium, lithium, rubidium, and cesium; $n$ is a whole integer of from 2 to 6, inclusive; when both Z's in Formula I are —C=, $m=6-n$, when one Z in Formula I is —C=, $m=5-n$, when both Z's in Formula I are —N=, $m=4-n$; $b$ is a whole integer of from 2 to 8, inclusive, when Z in Formula II is —C=, $a=8-b$, when Z in Formula II is —N=, $a=7-b$; $c$ is a whole integer of from 2 to 10, inclusive; $e$ is a whole integer of from 1 to 5, inclusive, $g$ is a whole integer of from 2 to 4, inclusive, and $p$ is a whole integer selected from the group consisting of 0 and 1.

The compounds of the above general formulas which are preferred are those which contain not more than three halogen atoms, and more preferably are dihalo-substituted compounds.

The alkali metal sulfides which can be employed in the process of said copending application are represented by the formula M$_2$S wherein M is as defined above, and includes the monosulfides of sodium, potassium, lithium, rubidium and cesium, including the anhydrous and hydrated forms of these sulfides. The preferred sulfide reactant is Na$_2$S and its hydrates. This sulfide can be purchased having 9 mols of water of hydration per mol of Na$_2$S, or it can be obtained containing about 60–62 weight percent Na$_2$S and about 38–40 weight percent water of hydration.

The polar organic compounds which are employed as reaction media in the process of said copending application should be solvents for the polyhaloaromatic compounds and the alkali metal sulfides. Representative examples of suitable classes of compounds include amides, lactams, sulfones, and the like. Specific examples of such compounds are hexamethylphosphoramide, tetramethylurea, N,N′-ethylene dipyrrolidone, N-methyl-2-pyrrolidone (NMP), pyrrolidone, caprolactam, N-ethylcaprolactam, sulfolane, dimethylacetamide, low molecular weight polyamides, and the like.

Some specific examples of polyhalo-substituted compounds of the above general formulas which can be employed in the process of said copending application are:

1,2-dichlorobenene
1,3-dichlorobenzene
1,4-dichlorobenzene
2,5-dichlorotoluene
1,4-dibromobenzene
1,4-diiodobenzene
1,4-difluorobenzene
2,5-dibromoaniline
N,N-dimethyl-2,5-dibromoaniline
1,3,5-trichlorobenzene
1,2,4-trichlorobenzene
1,2,4,5-tetrabromobenzene
hexachlorobenzene
1-n-butyl-2,5-dichlorobenzene, and the like.

As indicated above, in accordance with this invention a method for separating arylene sulfide polymers from slurries thereof with polar organic diluents and alkali metal halides and other impurities is provided, which method comprises subjecting the slurry to low pressure evaporation to remove essentially all of the polar organic diluent and then reslurrying the remaining polymer and impurities and washing with water and/or hydrocarbon and then centrifuging or filtering with additional washing if necessary for recovery of purified polymer. If the evaporation step is carried out in a separate vessel, the polar organic diluent is flashed overhead from the evaporator and after condensation can be returned to the polymerization reactor for reuse as desired. The polymer particles containing alkali metal halide and other impurities can be removed from the evaporation vessel by adding thereto water or other aqueous medium and/or a hydrocarbon to form a slurry which slurry can then be passed to the filtering system.

The conditions employed in the evaporation zone can vary appreciably but ordinarily reduced pressures will be employed. Pressures as low as 0.05 p.s.i.g. can be employed although the pressure will generally not be below 1 p.s.i.g. The temperature of the polymer slurry from the reactor will ordinarily range from 400 to 500° F. Temperature in the flash zone after pressure reduction will range from 200° F. to 400° F. depending upon the pressure in said flash zone. Flash zone pressure will be adjusted for substantialy complete flashing of diluent from the polymer. As indicated above, water and/or hydrocarbon can be used for reslurrying polymer particles following the evaporation. The amount of water or other aqueous medium and/or hydrocarbon added to the polymer particles will be sufficient to form a slurry that can be transferred from the evaporation zone to the filtering zone. Slurries having a solids content of 5 to 40 weight percent are usually employed.

Representative examples of hydrocarbons that can be employed for reslurrying the polymer particles include toluene, benzene, xylenes, ethylbenzene, or other hydrocarbon miscible with the polar organic diluent at the temperature existing in the flash zone. The hydrocarbon thus dissolves any residual diluent during the reslurrying step.

The slurry of polymer particles in water and/or hydrocarbon is passed to the filtering zone wherein the solid polymer is separated from the water and/or hydrocarbon. Any residual polar organic diluent is thus removed from the polymer with the water and/or hydrocarbon together with at least some of the alkali metal halide and other impurities. After removal of the water and/or hydrocarbon phase by filtration or centrifuging, the polymer is generally washed with water for removal of residual alkali metal halide. The washing with water may be accomplished on the filter or in the centrifuge or the solid polymer particles may be discharged ino a tank wherein they are reslurried with water and then refiltered or recentrifuged. Any conventional filter or centrifuge may be employed using conventional operating procedures.

EXAMPLE I

A slurry comprising 18 parts poly(phenylene sulfide), 16.5 parts NaCl and 65.5 parts N-methyl-pyrrolidone, formed by reacting p-dichlorobenzene with sodium sulfide in N-methyl-2-pyrrolidone diluent at 485° F. for 3 hours, was subjected to vacuum flashing and filtering according to the invention. The reaction slurry at a temperature of 485° F. was flashed to a pressure of 5 mm. Hg and a temperature of 350° F. whereby approximately 99 percent of the N-methyl-pyrrolidone was removed from the slurry.

The poly(phenylene sulfide) polymer particles containing salt and other impurities, which was substantially free of N-methyl-pyrrolidone, was slurried with either toluene or water or combination of toluene and water and then subjected to centrifuging. The centrifuging tests were conducted on a V-5 vertical centrifuge with a 5-inch diameter by 1⅞" deep basket manufactured by Baker Perkins, Saginaw, Mich. Filtrate rates of 35-37 pounds per minute per square foot were obtained at a speed to develop 930 G's.

The test data presented in Table I show that vacuum-flashed poly(phenylene sulfide) forms a granular cake in a filtering-type centrifuge, said cake being easily washed and easily transported into and out of the centrifuge. In test No. 1, simple reslurrying of the vacuum-flashed polymer with toluene followed by centrifuging produced a granular, easily handled polymer cake with an ash (principally sodium chloride) content of 55.9 percent. In test No. 2 the polymer cake left in the centrifuge after test No. 1 was washed with a small amount of water and the ash content reduced to 25.1 percent. In test No. 3 the cake was again washed with water and the ash content

TABLE I.—VACUUM FLASHED PPS CENTRIFUGE TESTS [1]

| Test No. | Description [2] | Force XG | Filtrate Drain Rate, lb./min./sq. foot | Wt. percent Volatiles of Wet Cake | Wt. percent Ash in Cake | Remarks |
|---|---|---|---|---|---|---|
| 1 | 100 gm. of vac. flashed PPS solids were slurried with 332 gm. toluene at 80° F. Slurry was centrifuged. | 305 | 12.5 | 19.7 | 55.9 | Sand-like lumps in slurry. Cake was granular and easily handled. |
| 2 | 115 gm. of wet cake from Test 1 were slurried with 220 gm. of distilled water at 80° F. and centrifuged. | 930 | 75 | 25.6 | 25.1 | Solids agglomerated into discrete easily centrifuged particles. Cake was granular and easily handled. |
| 3 | The cake from Test 2 was washed with 1,000 gm. of dist. H₂O in place on basket. | 930 | 40 | 39.3 | 9.3 | Cake was granular and easily handled. |
| 4 | 100 gm. of vac. flashed PPS solids were slurried with 400 gm. dist. H₂O at 212° F. and gently agitated for 3 min. then centrifuged. | 930 | 75 | 32.1 | 10.0 | Slurry appearance was pasty, but cake was granular and easily handled. |
| 5 | The cake from Test 4 was washed with 800 gm. dist. H₂O at 212° F. in place on basket. | 930 | 40 | 42.2 | 2.1 | Cake appearance was granular and easily dischargeable. |
| 6 | 100 gm. of vac. flashed PPS solids were slurried with 200 cc. toluene and 1,000 cc. dist. water at 180° F. and centrifuged. | 930 | 50 | 16.9 | 41.3 | Slurry was essentially homogeneous. No problems on centrifuging 2 phase liquid. Cake was granular and easily dischargeable. |
| 7 | The cake of Test 6 was washed with 500 cc. dist. H₂O at 180° F. in place on basket. | 930 | 40 | 30.7 | 9.7 | Filtrate settled nicely in 2 phases. Cake was granular and easily dischargeable. |
| 8 | 200 gm. of vac. flashed PPS solids were slurried for about 1 hour at 212° F. with 800 gm. dist. H₂O and centrifuged. | 930 | 50 | 32.3 | 10.6 | Cake was granular and easily dischargeable. |
| 9 | The cake of Test 8 was washed on basket with 800 g. dist. H₂O at 180-212° F. | 930 | 35 | 36.8 | 1.4 | Do. |

[1] All feedstock was PPS reactor effluent, vac. flashed in 2-gal. reactor. Reactor was fitted with anchor stirrer with ⅛" wall clearance. Flash distillation final conditions were 350° F. and 5 mm. Hg abs. pressure. Only 0.22 weight percent NMP solvent remained in solids after flashing.
[2] V-5 Baker-Perkins vertical clinical centrifuge was used. Basket was 5-inch in diameter by 1⅞" deep. No. 2 laboratory filter paper over cloth was used on basket as filtration medium.
In all tests there was very little loss of solids to the filtrate and it was expressed by the engineer conducting the tests that most of loss was due to leakage around edge of hand cut filter paper used on basket cloth. All filtrates had considerable light yellow-brown color indicating more washes were probably necessary. The centrifuge accumulator volume was less than 500 cc. and limited the volume of the wash.
PPS=Polyphenylene sulfide.

reduced to 93 percent. The additional test data should be self-explanatory, indicating that the vacuum-flashed poly(phenylene sulfide) is easily reslurried with water and/or toluene and then easily filtered on a filtering-type centrifuge to produce a polymer product with greatly reduced ash content. Additional washing of the polymer yields an essentially ash-free product.

It was observed in earlier tests that the poly(phenylene sulfide) formed a pasty cake in the presence of the N-methyl-pyrrolidone diluent and could not be washed free of sodium chloride or the diluent itself.

EXAMPLE II

In accordance with another run not according to the invention, a poly(phenylene sulfide) reactor effluent comprising poly(phenylene sulfide) polymer particles, NaCl and a small amount of water and N-methyl-pyrrolidone was dumped from the reactor into a product drum, water added to dissolve the salt, and then centrifuged to separate the precipitated polymer. It was observed that the polymer could not be recovered by gravity settling or by filtration because of extremely poor filtration characteristics. Recovery of the polymer was accomplished by centrifuging with difficulty but separation efficiency was very poor and the product contained excessive ash.

We claim:
1. A method for the recovery of finely divided poly(arylene sulfide) polymers substantially free of impurities from slurries comprising poly(arylene sulfide) and polar organic diluent and alkali metal halide and other impurities, which method comprises (a) first separating said polar organic diluent from said slurry by subjecting the slurry to an elevated temperature and reduced pressure for a period of time sufficient to volatilize and evaporate essentially all of the polar organic diluent therefrom leaving polymer, alkali metal halide and other impurities substantially freed of polar organic diluent, and (b) subsequently passing the resulting polymer, alkali metal halide and other impurities substantially freed of diluent slurried in water or a mixture of water and hydrocarbon through a filtering zone to remove polymer therefrom by forming a polymer cake in the filtering zone and recovering substantially pure polymer.

2. A process according to claim 1 wherein the polar organic diluent is removed from the slurry by evaporation by carrying out step (a) at a temperature within the range of 200–400° F., and washing alkali metal halide and other impurities from the cake with water or a mixture of water and hydrocarbon leaving substantially pure polymer.

3. The process according to claim 1 wherein said organic polar diluent is removed from said slurry prior to filtering by vacuum flashing the slurry at a temperature in the range of 200–400° F.

4. The process according to claim 1 wherein said slurry comprises the effluent from a poly(phenylene sulfide) reactor wherein a di-halo-benzene is reacted with sodium sulfide in the presence of a polar organic diluent.

5. The process according to claim 1 wherein said slurry comprises poly(phenylene sulfide), sodium chloride and N-methyl pyrrolidone and wherein the slurry is subjected to evaporation in step (a) to remove N-methyl pyrrolidone therefrom and wherein poly(phenylene sulfide) and sodium chloride are reslurried with water or a mixture of water and hydrocarbon to form a slurry of 5–40 weight percent polymer solids prior to being filtered in step (b).

6. A process according to claim 5 wherein said hydrocarbon used for reslurrying is toluene.

References Cited

UNITED STATES PATENTS

| 2,397,689 | 4/1946 | Pavlic et al. | 260—79.1 |
| 3,274,165 | 9/1966 | Lenz et al. | 260—79 |
| 3,317,487 | 5/1967 | Smith | 260—79 |
| 3,248,325 | 4/1966 | Graham | 252—33.6 |
| 3,354,129 | 11/1967 | Edmonds et al. | 260—79 |
| 3,386,950 | 6/1968 | Horvath et al. | 260—45.7 |

OTHER REFERENCES

Sorenson et al.: Preparative Methods for Polymer Chemistry, Interscience Publ., New York, pp. 128 to 131 (1961).

Weissberger: vol. III, part I, 2nd ed., Separation and Purification, Interscience Publ., pp. 303, 304, 564, 609, 612, 613, 789, 790, 817, 818, 829, 830, 831 (1956).

DONALD E. CZAJA, Primary Examiner

M. I. MARQUIS, Assistant Examiner

U.S. Cl. X.R.

260—79, 609